US007600646B2

(12) United States Patent
Styck et al.

(10) Patent No.: US 7,600,646 B2
(45) Date of Patent: Oct. 13, 2009

(54) CONVERSION KIT FOR ADJUSTING PIPELAYER FRAME WIDTH

(75) Inventors: Wayne George Styck, Chillicothe, IL (US); Timothy Edward Camacho, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 2 days.

(21) Appl. No.: 11/905,297

(22) Filed: Sep. 28, 2007

(65) Prior Publication Data

US 2009/0087266 A1 Apr. 2, 2009

(51) Int. Cl.
*B62D 55/32* (2006.01)

(52) U.S. Cl. ...................... 212/302; 180/9.48; 212/258; 212/270

(58) Field of Classification Search ................. 212/258, 212/270, 302; 180/9.48
See application file for complete search history.

(56) References Cited

U.S. PATENT DOCUMENTS 1,773,252 A * 8/1930 Bager et al. .................. 180/6.7
1,840,998 A 1/1932 Alban
2,681,231 A * 6/1954 Kondracki ................. 180/9.48
3,037,571 A * 6/1962 Zelle ......................... 180/9.48
3,236,391 A 2/1966 Kennedy
4,042,116 A 8/1977 Bertolino
4,083,459 A 4/1978 Allen
4,132,317 A * 1/1979 Arendt et al. ............... 212/301
5,332,110 A 7/1994 Forsyth
5,992,655 A 11/1999 Greenberg et al.
6,394,204 B1 * 5/2002 Haringer .................... 180/9.52
6,609,622 B2 8/2003 Forsyth
6,848,522 B2 * 2/2005 Moore et al. ................. 180/9.1
2006/0245888 A1 11/2006 Dietz et al.

FOREIGN PATENT DOCUMENTS

EP 1057777 A 12/2000

* cited by examiner

*Primary Examiner*—Thomas J Brahan
(74) *Attorney, Agent, or Firm*—Finnegan, Henderson, Farabow, Garrett & Dunner

(57) ABSTRACT

A conversion kit for converting a pipelayer frame of a first width to a different width is disclosed. The conversion kit has a spacer, removably attachable to a first side of the pipelayer frame, and a first plurality of replacement brackets for removably attaching the first side to a first track frame. The first plurality of replacement brackets have a different length than a first plurality of existing brackets that the first plurality of replacement brackets replace. The kit also has a second plurality of replacement brackets for removably attaching a second side of the pipelayer frame to a second track frame. The second plurality of replacement brackets have a different length than a second plurality of existing brackets that the second plurality of replacement brackets replace.

15 Claims, 4 Drawing Sheets

CONVERSION KIT FOR ADJUSTING PIPELAYER FRAME WIDTH

TECHNICAL FIELD

This disclosure is directed to a conversion kit and, more particularly, to a conversion kit for adjusting the width of a pipelayer frame.

BACKGROUND

Pipelayers are track-type work machines used in pipelaying operations, in which the pipelayer raises, lowers, and carries heavy pipes. In order to reduce the cost of producing pipelayers, standard bulldozer tractors are often converted into pipelayers. This conversion is accomplished by the installation of a pipelayer frame onto the standard bulldozer. The pipelayer frame typically includes a boom frame attached to one side of the bulldozer chassis and a counterweight frame attached to an opposing side of the chassis. With the boom and counterweight frames attached, the bulldozer effectively becomes a pipelayer.

Problems with converting bulldozers to pipelayers have arisen, particularly in relation to machines with varying configurations. That is, bulldozers can be configured with narrow configurations to minimize shipping widths or with wide configurations to minimize pressure exerted by the bulldozer on the ground. Problems occur in quickly and easily adjusting pipelayer frames to accommodate these various configurations. Service technicians require much time and effort, as well as numerous replacement parts, to change a pipelayer from a narrow configuration to a wide configuration.

One attempted solution to this problem is disclosed in U.S. Patent Publication No. 2006/0245888 A1 (the '888 publication) issued to Dietz et al. on Nov. 2, 2006. The '888 publication discloses a bulldozer fitted with a pipelayer frame, where the pipelayer frame comprises a first sub-frame attached to a first side of the bulldozer chassis, a second sub-frame attached to a second side of the chassis, and a cross-bar interconnecting the first and second subframes and being unattached to the chassis. The cross-bar of the '888 publication can be twisted in one direction to extend the length of the cross-bar, or in the other direction to shorten the cross-bar. Thus, the length of the cross-bar can be adjusted in order to fit between frames attached to chassises with various widths.

Although the system of the '888 publication may reduce the time and effort associated with converting between various pipelayer configurations, it may still be difficult and cumbersome to use. Specifically, the system of the '888 publication requires precision to adequately fit the frame to a given width and thus, the conversion time and effort may still be excessive for an inexperienced technician.

The pipelayer frame of the present disclosure solves one or more of the problems set forth above.

SUMMARY OF THE DISCLOSURE

In one aspect, the present disclosure is directed to a conversion kit for converting a pipelayer frame of a first width to a different width. The kit includes a spacer, removably attachable to a first side of the pipelayer frame, and a first plurality of replacement brackets for removably attaching the first side to a first track frame. The first plurality of replacement brackets have a different length than a first plurality of existing brackets that the first plurality of replacement brackets replace. The kit also includes a second plurality of replacement brackets for removably attaching a second side of the pipelayer frame to a second track frame. The second plurality of replacement brackets have a different length than a second plurality of existing brackets that the second plurality of replacement brackets replace.

In another aspect, the present disclosure is directed toward a method for converting a pipelayer of a first width to a different width. The method includes disconnecting a first side frame from a center frame, spacing apart the first side frame and the center frame, and reconnecting the first side frame and the center frame. The method also includes removing a first plurality of existing brackets attaching the first side frame to a first track frame of the pipelayer, and replacing the first plurality of existing brackets with a first plurality of replacement brackets.

DETAILED DESCRIPTION

Figure 1:
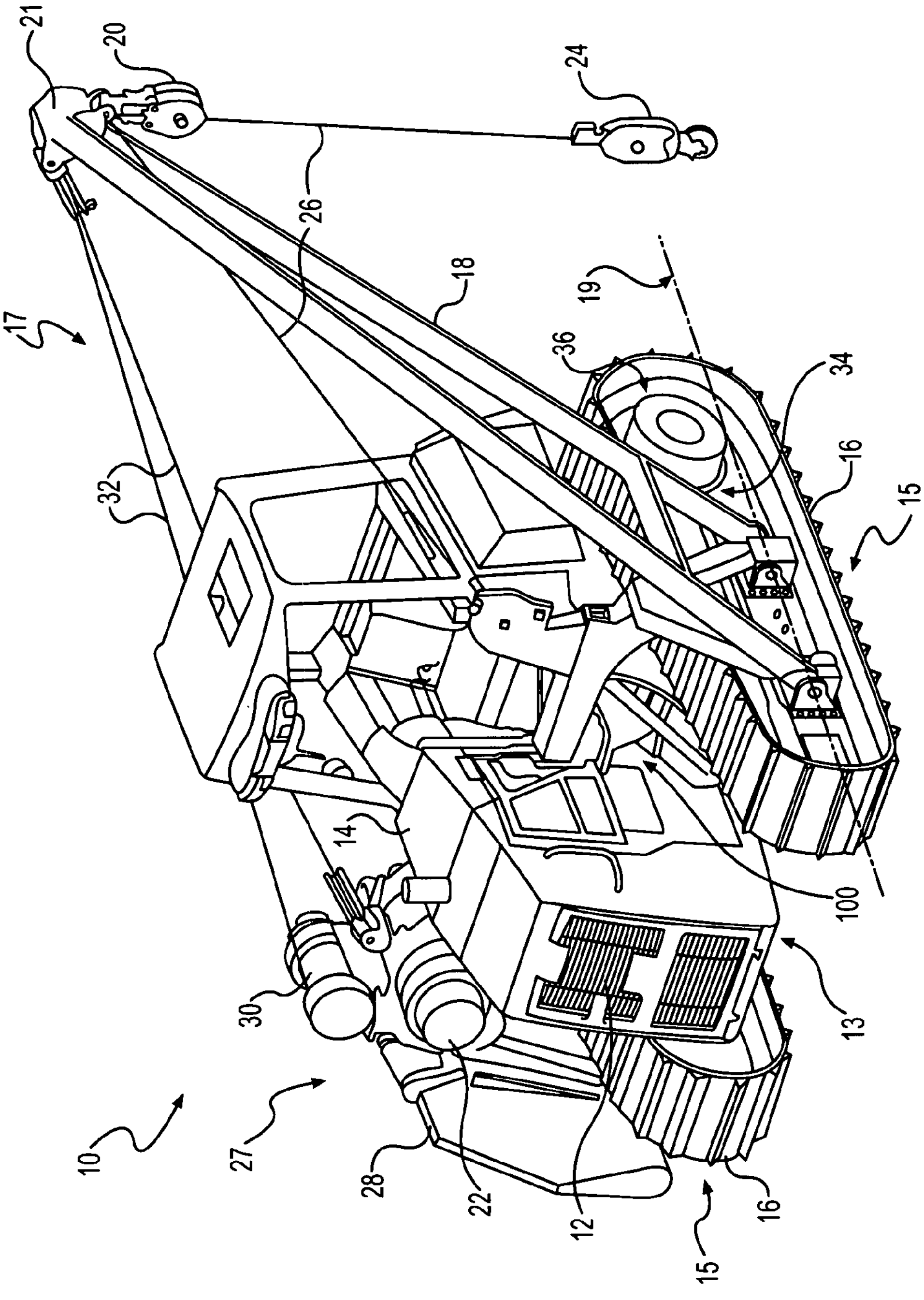
FIG. 1 is a pictorial illustration of an exemplary disclosed machine.

FIG. 1 illustrates an exemplary disclosed machine 10. Machine 10 may be a crawler-type tractor and may perform tasks associated with an industry such as construction. Machine 10 may include an engine 12 mounted within an engine hood or compartment 14 and located on a chassis 13. Machine 10 may also include a drive system (not shown) connected to engine 12 for transmitting power from engine 12 to one or more track assemblies 15 to propel machine 10.

In one embodiment, machine 10 may be configured as a pipelayer (shown in FIG. 1). As such, machine 10 may include a boom assembly 17 mounted to a pipelayer frame 100. Boom assembly 17 may be removably attached to pipelayer frame 100 and may include a boom 18 such as a lattice type boom. Boom assembly 17 may further include a pulley block 20 attached to a distal end 21 of boom 18, and a winch 22. A cable 26 may be attached to winch 22 and wound over pulley block 20. A hoist hook 24 may be suspended from cable 26. As such, a hoisted load (e.g. a pipe) hung by hoist hook 24 may be raised and lowered by winding and unwinding cable 26 around winch 22. Boom assembly 17 may also include a second winch 30. A cable 32 may connect winch 30 to distal end 21 of boom 18, allowing winch 30 to raise and lower boom 18 by winding and unwinding cable 32 around winch 30. Winch 22 and winch 30 may be any suitable type of rotary actuators known in the art, such as hydraulic or electric motors.

Machine 10 may also include a counterweight assembly 27 removably attached to pipelayer frame 100. Counterweight assembly 27 may include a counterweight 28, serving to balance the hoisted load carried by hoist hook 24 by providing a counteracting moment that opposes a moment caused by the hoisted load of boom assembly 17. Each moment corresponds to each weight (hoisted load or counterweight 28) acting over a horizontal distance of that weight from a machine center of gravity. The horizontal distance of counterweight 28 from the machine center of gravity may be adjusted with an actuator (not shown) to produce a desired counteracting moment that opposes various moments caused by the hoisted load.

Track assembly 15 may include a track frame 34, which may be structurally attached to chassis 13. Track frame 34 may support ground wheels (not shown) located toward a bottom of track assembly 15. Track frame 34 may also support additional wheels at a front and a back of track assembly 15. These wheels may serve to frame an elliptical pattern, about which an endless track 16 may be wound. The wheels may be free to rotate, their rotation allowing a movement of track 16 around the elliptical pattern. Track frame 34 may also support a sprocket 36, which may be situated at the rear of track assembly 15. Engine 12 may drive sprocket 36 to rotate. Sprocket 36 may include metal teeth that mesh with links of track 16, allowing the rotation of sprocket 36 to drive track 16.

Figure 2:
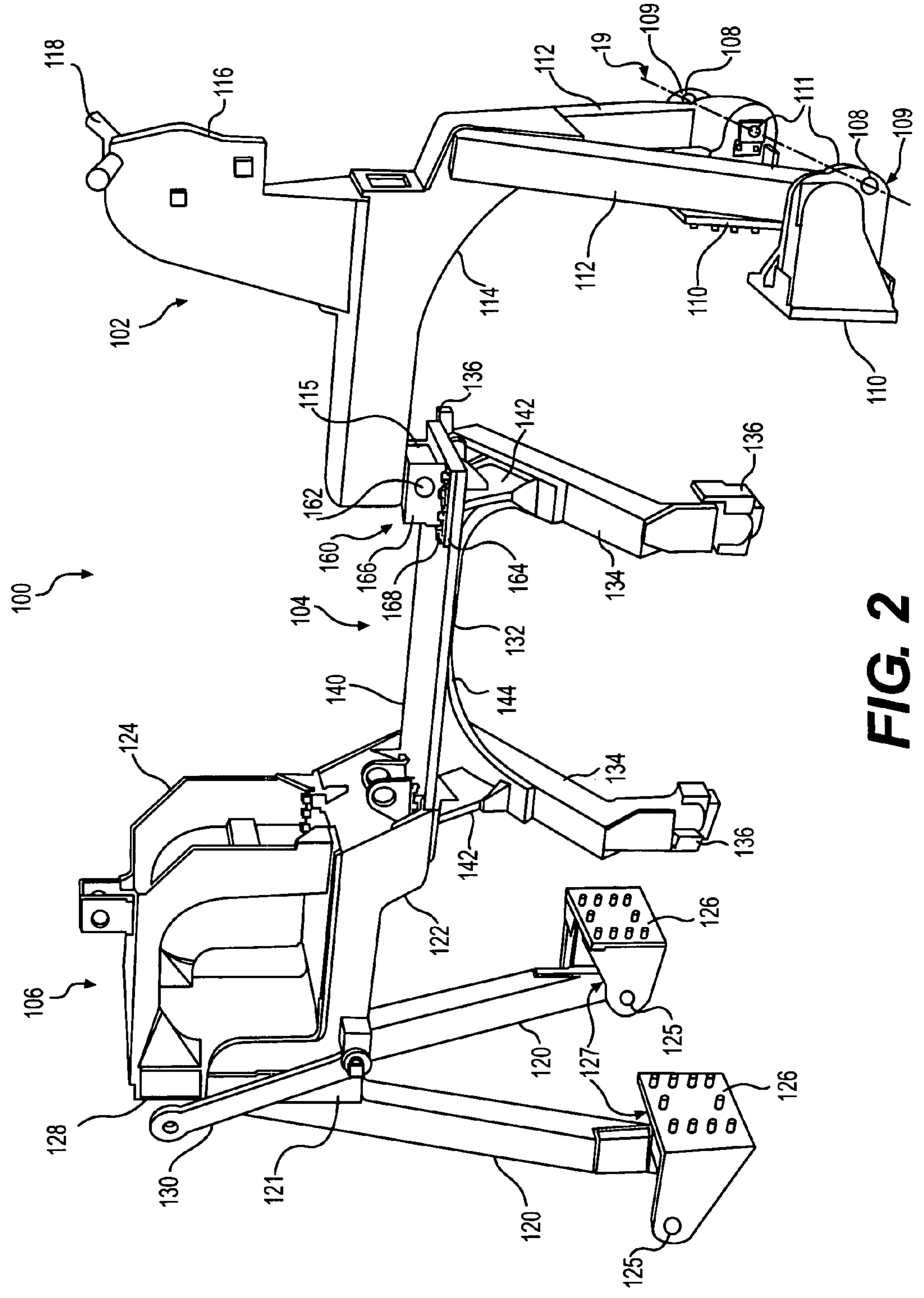
FIG. 2 is a pictorial illustration of an exemplary disclosed pipelayer frame that may be used with the machine of FIG. 1.

Pipelayer frame 100 may be removably attached to machine 10 when converting machine 10 into a pipelayer. As illustrated in FIG. 2, pipelayer frame 100 may include a boom frame 102, a center frame 104, and a counterweight frame 106. Boom frame 102 may serve to receive boom assembly 17. Boom frame 102 may include a plurality of struts 112, a horizontal member 114, and a projecting member 116. Struts 112 and projecting member 116 may be permanently attached to horizontal member 114 by any suitable means known in the art, including welding. Boom frame 102 may also include cable guide 118 located at a top of projecting member 116. Cable guide 118 may serve as a guide for cable 26 during the raising and lowering of hoist hook 24.

Horizontal member 114 may also include an extension 115 having a bored hole. The hole of extension 115 may be sized to receive a pin 162 of a clevis and pin assembly 160. Clevis and pin assembly 160 may also include vertical plates 166 permanently fixed (e.g. welded) to a base plate 164. Vertical plates 166 may include bores aligned with the bored hole in extension 115 and sized to receive pin 162. Pin 162 may be removably attached between the bores of vertical plates 166. Clevis and pin assembly 160 may also include a plurality of bolts 168 that can be inserted through holes provided in base plate 164. Bolts 168 may serve to removably attach clevis and pin assembly 160 to center frame 104, as described further below. Pin 162 may be retained in the bores of vertical plates 166 by any suitable means known in the art, including cotter pins (not shown) being inserted transversely through recesses (not shown) in the body of pin 162.

Boom frame 102 may include removably attachable brackets 110. Each bracket 110 may include three bracket plates 109. A first bracket plate 109 may include a hole (not shown) for receiving a pin 111 capable of connecting strut 112 to bracket 110. Second and third bracket plates 109 may each contain a hole 108. Each hole 108 may be aligned with the hole in the first bracket plate 109 and sized for receiving pin 111 capable of connecting the ends of boom 18 to bracket plate 109. This connection may allow rotation of boom 18 about an axis 19 passing through holes 108 when winch 30 winds and unwinds cable 32. Brackets 110 may serve to removably attach boom frame 102 to an outer side of track frame 34 (referring to FIG. 1). Brackets 110 may be removably attached to track frame 34 by any suitable means known in the art such as, for example, bolting.

Counterweight frame 106 may serve to receive counterweight assembly 27. Counterweight frame 106 may include a plurality of struts 120, a plate 121, a horizontal member 122, and a support member 124. Support member 124 may be permanently attached to horizontal member 122 by any suitable means known in the art, including welding. Struts 120 may be permanently attached to plate 121 by any suitable means known in the art, including welding. Plate 121 may be removably attached to horizontal member 122 by any suitable means known in the art, including bolting. Counterweight frame 106 may also include removably attachable brackets 126, which are substantially similar to brackets 110. Each bracket 126 may include a bracket plate 127. Brackets 126 may serve to removably attach counterweight frame 106 to an outer side of track frame 34 of machine 10. Brackets 126 may be removably attached to track frame 34 by any suitable means known in the art such as, for example, bolting.

Support member 124 may serve as a mounting platform for winch 22 and winch 30. Support member 124 may also include link assemblies 128. Link assemblies 128 may include holes for receiving fasteners that lock counterweight 28 in place. Horizontal member 122 may include lockout latch 130. Lockout latch 130 may selectively lock the actuator of counterweight assembly 27, preventing horizontal movement of counterweight 28.

Center frame 104 may include a generally C-shaped frame 132 and two struts 134. C-shaped frame 132 may be a built-up member including a top flange 140, a plurality of webs 142, and a bottom flange 144. Struts 134 may be connected to C-shaped frame 132 by any suitable means known in the art, including welding. Center frame 104 may include bracket assemblies 136, located at each end of each strut 134. Horizontal member 122 of counterweight frame 106 may be removably attached to one end of top flange 140 of C-shaped frame 132 by any suitable means known in the art, including bolting. Clevis and pin assembly 160 may be removably attached to an opposite end of top flange 140 through the use of bolts 168. Extension 115 of horizontal member 114 may receive pin 162 of clevis and pin assembly 160, effectively connecting boom frame 102 to center frame 104.

Figure 3:
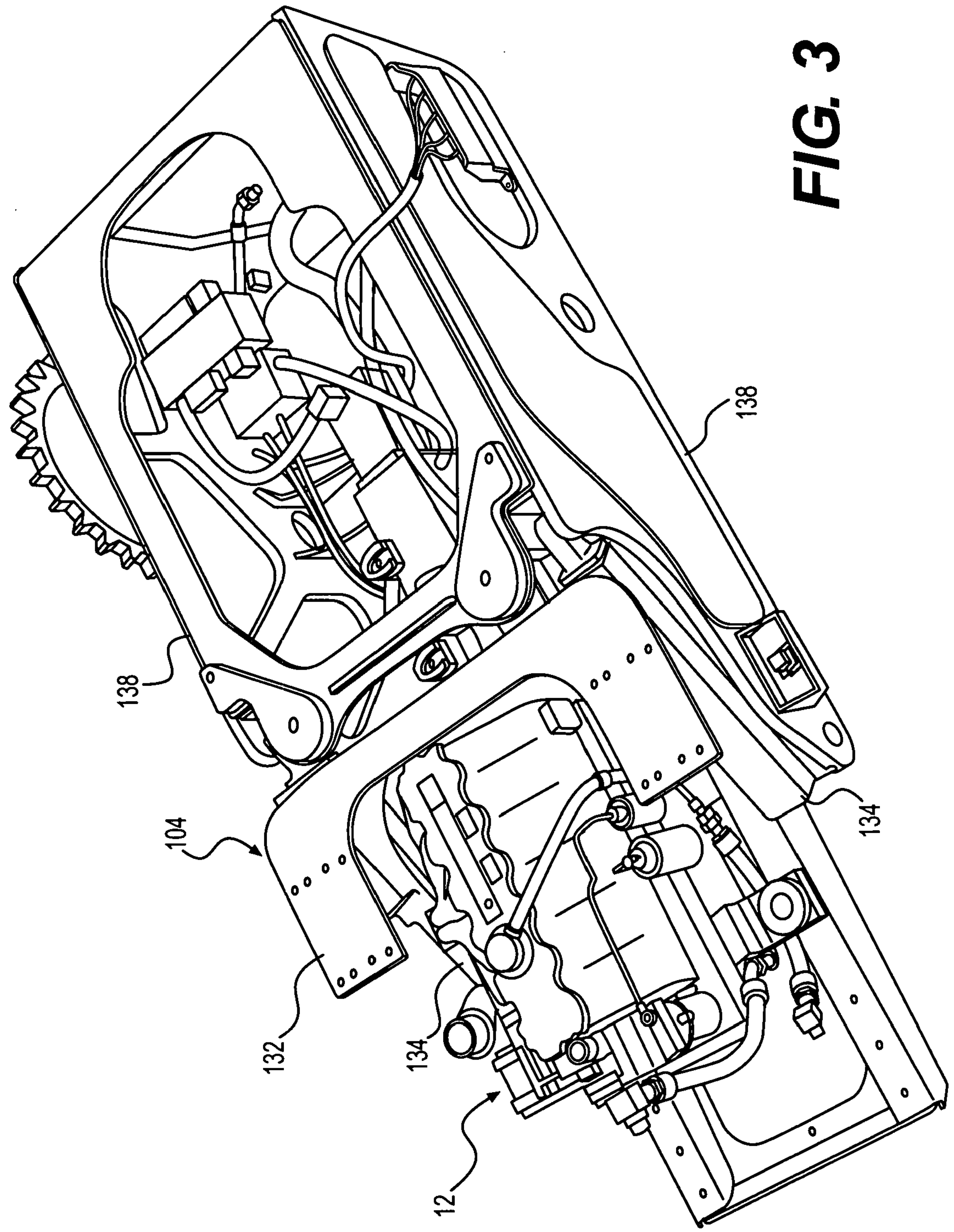
FIG. 3 is a pictorial illustration of an exemplary disclosed center portion of the pipelayer frame of FIG. 2.

As illustrated in FIG. 3, center frame 104 may fit inward of side walls 138, forming a portion of engine hood or compartment 14 (shown in FIG. 1). Bracket assemblies 136 of center frame 104 may be removably attached to an inside of engine housing side walls 138 by any suitable method known in the art, including bolting or pinning. In this manner, center frame 104 may be located substantially within compartment 14 and firmly attached to machine 10.

The width of pipelayer frame 100, as defined by a distance between brackets 110 and 126, may be adjusted. FIG. 2, as described above, illustrates an exemplary short width of pipelayer frame 100. This width may be increased by the addition of a spacer assembly 150 and replacement brackets 170 and 180 and the manipulation of clevis and pin assembly 160. Spacer assembly 150, shown in FIG. 4, may be a structural member configured to attach between plate 121 and horizontal member 122 of counterweight frame 106. Spacer assembly 150 may be removably attached to plate 121 and horizontal member 122 by a plurality of bolts 152.

Because of the addition of spacer assembly 150, the location of brackets 126 may be accordingly moved away from each other and away from track frame 34 by a distance equal to a thickness of spacer assembly 150. Therefore, brackets 126 may no longer be able to attach to track frame 34. Brackets 126 may be removed from struts 120 of counterweight frame 106 by removing pins 125 from the connection described above. A replacement bracket 170 (shown in FIG. 4) may be connected to strut 120 to replace bracket 126. Each replacement bracket 170 may be substantially similar to bracket 126, but may have a different length (i.e. bracket 170 may be longer than bracket 126). Each bracket 170 may include a bracket plate 172, having a hole 174, and a plurality of bracket plates 173. For example, brackets 170 may be longer than brackets 126 by a length substantially equal to a thickness of spacer assembly 150. Therefore, brackets 170 may serve to removably attach counterweight frame 106 to an outer side of track frame 34 of machine 10. Brackets 110 may be removably attached to track frame 34 by any suitable means known in the art such as, for example, bolts 176 shown in FIG. 4.

Clevis and pin assembly 160 may also help to adjust the width of pipelayer frame 100. As described above, clevis and pin assembly 160 may be removably attached to center frame 104 by bolts 168 and to boom frame 102 by pinned connection. The holes of vertical plates 166 supporting pin 162 may be horizontally offset from a centerline 169 of base plate 164. To increase the width of pipelayer frame 100, clevis and pin assembly 160 may be detached from center frame 104 and boom frame 102 and rotated approximately 180° about a vertical axis 167. With this reversed orientation, clevis and pin assembly 160 may be re-attached to center frame 104 by bolts 168 and to boom frame 102 by pin 162. Since pin 162 may be horizontally offset from centerline 169, the location of pin 162 may shift outward toward track assembly 15 after rotation. This shift effectively adjusts the position of boom frame 102 relative to center frame 104, resulting in an increased width of pipelayer frame 100. This shift may be substantially equal to the width of spacer assembly 150, thereby allowing a symmetric width change in pipelayer frame 100 on both the counterweight side and the boom side.

Figure 4:
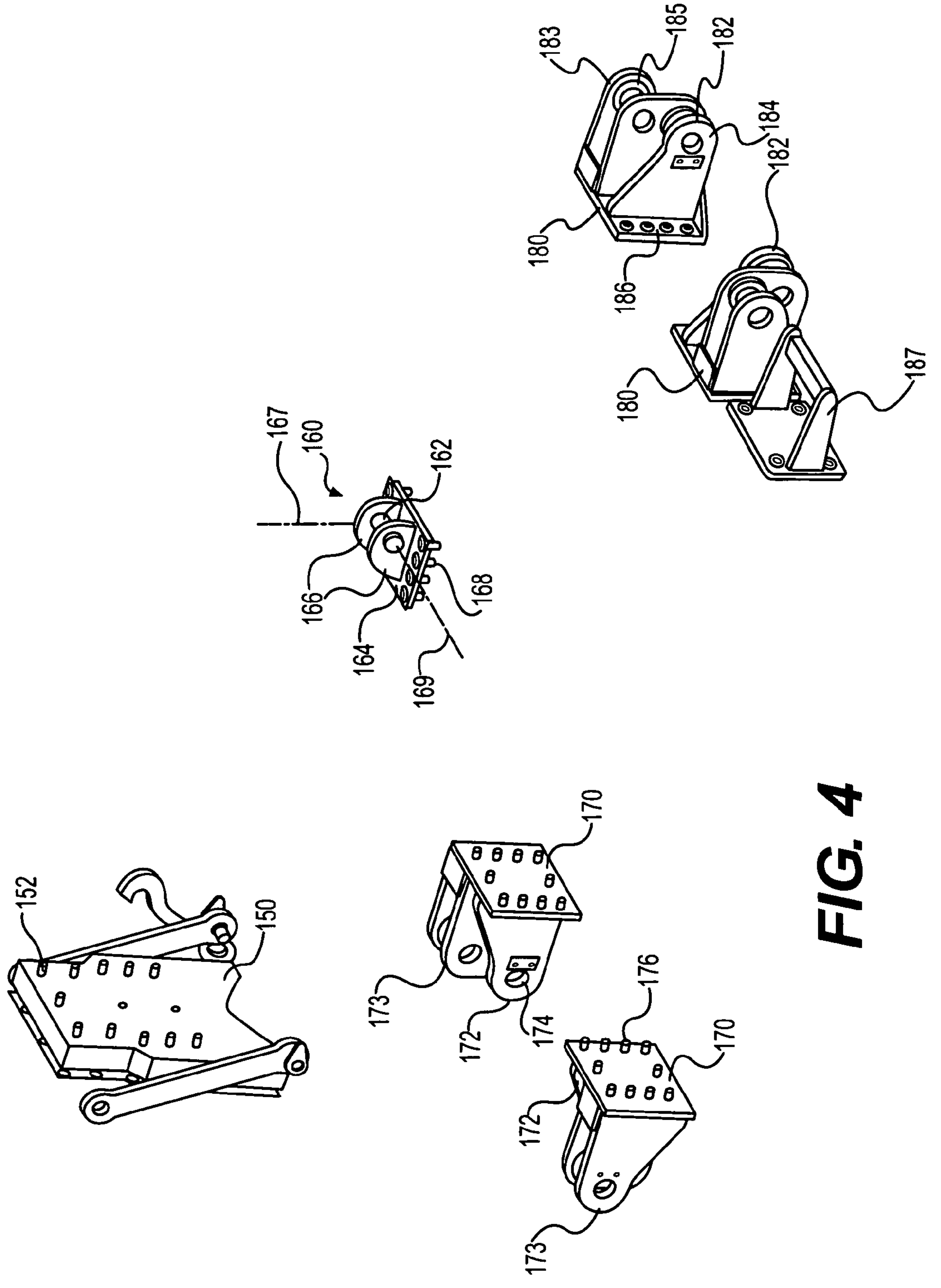
FIG. 4 is a pictorial illustration of an exemplary disclosed adjustment assembly that may be used with the pipelayer frame of FIG. 2.

Because of the change in orientation to clevis and pin assembly 160, the location of brackets 110 may be accordingly moved away from brackets 126 (or 170) and away from track frame 34. Therefore, brackets 110 may no longer be able to attach to track frame 34. Brackets 110 may be removed from struts 112 of boom frame 102 by removing pins 111. A replacement bracket 180 (shown in FIG. 4) may be connected to strut 112 to replace bracket 110. Each replacement bracket 180 may be substantially similar to bracket 110, but may have a longer length. As shown in FIG. 4, replacement bracket 180 may include a bracket plate 182, having a hole 184, and a plurality of bracket plates 183 having holes 185. A step 187, serving to assist operators in climbing onto the newly configured machine 10, may be attached to bracket 180. Brackets 180 may be long enough to compensate for the adjustment caused by clevis and pin assembly 160. Therefore, brackets 180 may serve to removably attach boom frame 102 to an outer side of track frame 34 of machine 10. Brackets 180 may be removably attached to track frame 34 by any suitable means known in the art such as, for example, by bolts 186 shown in FIG. 4.

The components required for converting pipelayer frame 100 from a first to width to a different width may be assembled and packaged into a conversion kit. The conversion kit may have a "single part number," meaning that the kit can be ordered and distributed as a single sales item to consumers. The entire contents of the conversion kit, serving to increase the width of pipelayer 100, may include spacer assembly 150, bolts 152, bracket 170, bracket 180, and instructions. The conversion kit may or may not also include additional bolts for attaching brackets 170 and 180 to track frames 34. In some embodiments, bolts may be unnecessary because brackets 170 and 180 may be attached to track frames 34 using the same bolts that attach brackets 110 and 126. Similarly, the conversion kit may or may not include additional pins for pinning brackets 170 and 180 to pipelayer frame 100, because pins 111, in some embodiments, may be used for both brackets 110 and 180 and pins 125 may be used for both brackets 126 and 170. In an alternative embodiment, the conversion kit may decrease the width of pipelayer 100. In this alternative embodiment, the conversion kit may include bracket 110, bracket 180, and instructions.

INDUSTRIAL APPLICABILITY

The disclosed conversion kit may be used to quickly convert a pipelayer of a first width to a different width with only a minimum amount of adjustment and few replacement parts. Therefore, a technician may quickly adjust the pipelayer frame from a first width to another desired width without substantial cost to an owner of the machine.

Pipelayer frame 100 may be easily adjusted between a first embodiment (shown in FIG. 2) and a second wider embodiment, where all parts except for spacer assembly 150 and extension brackets 170 and 180 are common to both embodiments. The first embodiment may correspond to a narrow width pipelayer, which may be required for limited clearances in transporting machine 10. In this first embodiment, clevis and pin assembly 160 may be attached to center frame 104 through bolts 168 and to horizontal member 114 of boom frame 102 by pin 162 as shown in FIG. 2. Brackets 110 of boom frame 102 may be attached to track frame 34, as shown in FIG. 1. Brackets 126 of counterweight frame 106 may also be attached to track frame 34, as shown in FIG. 1.

If a pipelayer with a wider width is required, such as for an application requiring low ground pressure, the machine of FIG. 1 may be converted to the configuration of FIG. 2. To perform this conversion, brackets 126 may be removed from track frame 34, and plate 121 may be removed from horizontal member 122. Spacer assembly 150 may be attached to plate 121, and to horizontal member 122, so that spacer assembly 150 is located between plate 121 and horizontal member 122. Since the insertion of spacer assembly 150 effectively shifts brackets 126 outward, away from track frame 34, brackets 126 may be removed by withdrawing pins 125 connecting brackets 126 to struts 120. Brackets 170 may be connected to struts 120 in place of brackets 126 by inserting pins 125 through holes 174. Brackets 170 may be attached to track frame 34 with bolts 176.

The pin of clevis and pin assembly 160 may be removed from center frame 104 by removing bolts 168. Clevis and pin assembly 160 may be removed from boom frame 102 by removing pin 162. Brackets 110 may be disconnected from track frame 34. Clevis and pin assembly 160 may be rotated about 180° around vertical axis 167. Clevis and pin assembly 160 may be re-attached to center frame 104 via bolts 168 and to boom frame 102 by inserting pin 162 through vertical plates 166 and the hole of extension 115. Since pin 162 may be horizontally offset from centerline 169 of base plate 164, the width of pipelayer frame 100 may be effectively increased, shifting brackets 110 out and away from track frame 34. Brackets 110 may be removed from boom frame 102 by withdrawing pin 111 connecting brackets 110 to struts 112. Boom 18 may also be removed from brackets 110 by removing pin 111. Brackets 180 may be connected to struts 112 in place of brackets 110 by inserting pin 111 through holes 184. Boom 18 may be attached to brackets 180 by inserting pin 111 through holes 185. Brackets 180 may be attached to track frame 34 with bolts 186.

The disclosed conversion kit may be used to quickly convert a pipelayer of a first width to a different width. Since pipelayer frame 100 has multiple components (e.g. spacer assembly 150 and clevis and pin assembly 160) capable of adjusting, technicians may use combinations of the adjustable components to quickly configure pipelayer frame 100 into numerous widths. For example, no adjustment components could be used to extend the width, only one adjustment component (either spacer assembly 150 or clevis and pin assembly 160) could be used to extend the width, or both spacer assembly 150 and clevis and pin assembly 160 could be used to extend the width. Since spacer assembly 150 and clevis and pin assembly 160 may be quickly adjusted by technicians, little time and effort may be necessary to fit pipelayer frame 100 to machine 10. Except for spacer assembly 150 and extension brackets 170 and 180, all parts of the disclosed embodiments may be common, making pipelayer frame 100 easily adaptable between various machine widths and uses with little cost to the owner of machine 10.

It will be apparent to those skilled in the art that various modifications and variations can be made to the disclosed frame system. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A conversion kit for converting a pipelayer frame of a first width to a different width, the conversion kit comprising:
- a spacer, removably attachable to a first side of the pipelayer frame;
- a first plurality of replacement brackets for removably attaching the first side of the pipelayer frame to a first track frame, wherein the first plurality of replacement brackets have a different length than a first plurality of existing brackets that the first plurality of replacement brackets replace; and
- a second plurality of replacement brackets for removably attaching a second side of the pipelayer frame to a second track frame, wherein the second plurality of replacement brackets have a different length than a second plurality of existing brackets that the second plurality of replacement brackets replace, wherein a difference in length between the first plurality of replacement brackets and the first plurality of existing brackets, and a difference in length between the second plurality of replacement brackets and the second plurality of existing brackets, are both substantially equal to a thickness of the spacer.

2. The conversion kit of claim 1, further including a plurality of bolts for attaching the spacer to the first side of the pipelayer frame.

3. The conversion kit of claim 1, wherein the first plurality of replacement brackets are attached to the first track frame, the first plurality of replacement brackets including a plurality of bolt holes that generally match a plurality of bolt holes of the first plurality of existing brackets.

4. The conversion kit of claim 1, wherein the second plurality of replacement brackets are attached to the second track frame, the second plurality of replacement brackets including a plurality of bolt holes that generally match a plurality of bolt holes of the second plurality of existing brackets.

5. A method for converting a pipelayer frame of a first width to a different width, the method comprising:
- disconnecting a first side frame of the pipelayer frame from a center frame of the pipelayer frame;
- spacing apart the first side frame and the center frame;
- attaching a spacer between the first side frame and the center frame;
- reconnecting the first side frame and the center frame;
- removing a first plurality of existing brackets attaching the first side frame to a first track frame;
- replacing the first plurality of existing brackets with a first plurality of replacement brackets having a different length than the first plurality of existing brackets;
- wherein a difference in length between the first plurality of replacement brackets and the first plurality of existing brackets is substantially equal to a thickness of the spacer.

6. The method of claim 5, further including:
- removing a second plurality of existing brackets attaching a second side frame of the pipelayer frame to a second track frame; and
- replacing the second plurality of existing brackets with a second plurality of replacement brackets having a different length than the second plurality of existing brackets.

7. The method of claim 5, further including disconnecting a second side frame from the center frame, repositioning a connector between the second side frame and the center frame to space apart the second side frame and the center frame, and reconnecting the second side frame to the center frame.

8. The method of claim 7, further including spacing apart the first side frame and the center frame, and the second side frame and the center frame, by substantially the same distance.

9. A pipelayer frame for supporting a boom and a counterweight, the pipelayer frame comprising:
- a center frame;
- first side of the pipelayer frame removably attachable to the center frame;
- a second side of the pipelayer frame removably attachable to the center frame;
- a first plurality of existing brackets for attaching the first side of the pipelayer frame to a first track frame;
- a second plurality of existing brackets for attaching the second side of the pipelayer frame to a second track frame; and
- a conversion kit for converting the pipelayer frame from a first width to a different width, the conversion kit including:
  - a spacer, removably attachable to the first side of the pipelayer frame;
  - a first plurality of replacement brackets for removably attaching the first side of the pipelayer frame to the first track frame, wherein the first plurality of replacement brackets have a different length than the first plurality of existing brackets that the first plurality of replacement brackets replace; and
  - a second plurality of replacement brackets for removably attaching the second side of the pipelayer frame to the second track frame, wherein the second plurality of replacement brackets have a different length than the second plurality of existing brackets that the second plurality of replacement brackets replace, further including an adjustable assembly, where the adjustable assembly connects the second side of the pipelayer frame to a center of the pipelayer frame, wherein the adjustable assembly is repositioned and reattached to the second side of the pipelayer frame and to the center of the pipelayer frame, wherein a difference in length associated with repositioning the adjustment assembly is substantially equal to a thickness of the spacer.

10. The pipelayer frame of claim 9, further including a plurality of bolts for attaching the spacer to the first side of the pipelayer frame.

11. The pipelayer frame of claim 9, wherein the spacer is a plate attached to the first side of the pipelayer frame.

12. The pipelayer frame of claim 9, further including an adjustable assembly located between the second side and the center frame.

13. The pipelayer frame of claim 12, wherein the adjustable assembly includes a clevis and a pin.

14. The pipelayer frame of claim 13, wherein the clevis includes a plurality of plates, at least one of the plurality of plates having an orifice.

15. The pipelayer frame of claim 14, wherein the orifice is offset from a centerline of the clevis.

* * * * *